United States Patent Office 2,965,649
Patented Dec. 20, 1960

2,965,649

OXATHIANIUM, THIAPYRYLIUM, AND THIOPHENIUM COMPOUNDS

Howard Johnston, Concord, Calif., assignor to The Dow Chemical Company, Midland, Mich., a corporation of Delaware No Drawing. Filed July 18, 1958, Ser. No. 749,332

7 Claims. (Cl. 260—327)

This invention is concerned with compounds corresponding to the formula

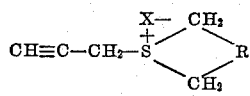

In this and succeeding formulae, X represents chlorine, bromine or iodine and R represents ethylene, trimethylene or oxydimethylene. These new compounds are crystalline solids which are somewhat soluble in water and ionizing solvents such as methanol and ethanol and of low solubility in organic solvents such as methylene dichloride, acetone, hexane and diethyl ether. The compounds have been found to possess cholinergic activity analogous to that of acetyl choline. Thus, the compounds are particularly adapted to be employed in investigations of the activity of drugs upon smooth muscle tissue.

The new compounds may be prepared by mixing or blending p-oxathiane, tetrahydrothiophene or tetrahydrothiapyran with a propargyl halide. The contacting of the reactants may be carried out in an organic reaction medium such as hexane, diethyl ether or methylene chloride. The amounts of the reactants to be employed are not critical, some of the desired product being obtained when any proportion of ingredients is employed. Good results are obtained when employing substantially equimolecular proportions of the reactants. The reaction takes place smoothly at temperatures of from 15° to 50° C. During the course of the reaction, the desired product usually separates from the reaction mixture as a crystalline solid. When the product does not separate during the reaction, precipitation of the product may be effected by cooling. Following the reaction, the product may be separated by filtration and thereafter purified by washing with an inert organic solvent and by recrystallization from a solvent such as alcohol.

In carrying out the reaction, the propargyl halide and p-oxathiane, tetrahydrothiophene or tetrahydrothiapyran, and solvent, if employed, are combined with stirring and at a temperature of from 15° to 50° C. Following the reaction, the product is separated and purified as previously described.

The following examples illustrate the invention but are not to be construed as limiting:

EXAMPLE 1

*4-(2-propynyl)-p-oxathianium bromide*

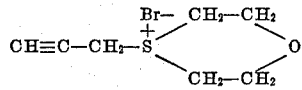

2-propynyl bromide (13.3 grams; 0.112 mole) and 11.6 grams (0.112 mole) of p-oxathiane were mixed and blended together and the resulting mixture set aside for ten days at room temperature. During this period, a 4-(2-propynyl)-p-oxathianium bromide product precipitated in the reaction mixture as a crystalline solid. The product was separated by filtration, washed with methylene chloride and dried. The dried product melted at 140°–141° C. and contained 35.13 percent bromine as compared to a theoretical content of 35.5 percent.

EXAMPLE 2

*Tetrahydro-1-(2-propynyl)-thiophenium iodide*

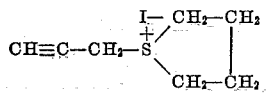

2-propynyl iodide (0.4 mole) is mixed with 0.4 mole of tetrahydrothiophene and the resulting mixture set aside for two days at room temperature. The mixture is then filtered to separate a tetrahydro-1-(2-propynyl)-thiophenium iodide as a crystalline solid.

EXAMPLE 3

*Hexahydro-1-(2-propynyl)-thiapyrylium bromide*

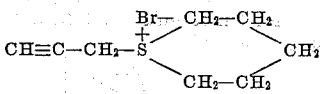

2-propynyl bromide (28.8 grams; 0.242 mole) was mixed with 20.9 grams (0.206 mole) of tetrahydrothiapyran, and the resulting mixture warmed to 35° C. and thereafter set aside at room temperature for three days. The reaction mixture was thereafter filtered to separate a hexahydro-1-(2-propynyl)-thiapyrylium bromide product as a crystalline solid. This product was washed with acetone, dried and the dried product found to melt at 115°–117° C. The reaction of 0.2 molar quantities of each of propargyl chloride and tetrahydrothiapyran in an exactly similar manner gives a hexahydro-1-(2-propynyl)-thiapyrylium chloride product as a crystalline solid material.

EXAMPLE 4

*Tetrahydro-1-(2-propynyl)-thiophenium bromide*

2-propynyl bromide (20 grams; 0.17 mole) was added in one portion with stirring to 15.0 grams (0.17 mole) of tetrahydrothiophene dispersed in 25 milliliters of methylene chloride. The reaction mixture was thereafter set aside for several days at room temperature and thereafter filtered to separate a tetrahydro-1-(2-propynyl)-thiophenium bromide product as a crystalline solid. The product was washed with diethyl ether and dried. The dried product melted at 82°–84.5° C. and had a bromine content of 38.2 percent as compared with a theoretical content of 38.7 percent.

In a similar manner other halide compounds of the present invention may be prepared as follows:

4-(2-propynyl)-p-oxathianium chloride by the reaction of 2-propynyl chloride and p-oxathiane.

Tetrahydro-1-(2-propynyl)-thiophenium chloride by the reaction of 2-propynyl chloride and tetrahydrothiophene.

Hexahydro-1-(2-propynyl)-thiapyrylium iodide by the reaction of 2-propynyl iodide and hexahydrothiapyran.

4-(2-propynyl)-p-oxathianium iodide by the reaction of 2-propynyl iodide and p-oxathiane.

Hexahydro-1-(2-propynyl)-thiapyrylium iodide by the reaction of 2-propynyl iodide and hexahydro thiapyran.

The compounds have been found to have cholinergic activity and to mimic the activity of acetylcholine upon the autonomic ganglia and post ganglionic parasympathetic fibers of the autonomic nervous system. The compounds are particularly adapted to be employed in studies of the action of drugs upon smooth muscle tissue. In representative operations, compositions containing one part per million by weight of the compounds are found in studies with isolated sections of smooth muscle tissue taken from dogs to constrict the muscle fibers in intestinal smooth muscle and to relax the muscle fibers in vascular smooth muscle. The compounds are also adapted to be employed in studies of the effect of many drugs upon the cardiovascular systems in animals. In representative operations, very small amounts of the compounds depress the blood pressure and increase the activity of the nictitating membrane in dogs and cats.

I claim:

1. A compound corresponding to the formula

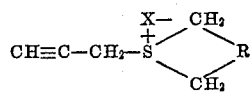

wherein X represents a member of the group consisting of chlorine, bromine and iodine; and R represents a radical selected from the group consisting of ethylene, trimethylene and oxydimethylene.

2. 4-(2-propynyl)-p-oxathianium bromide.
3. 4-(2-propynyl)-p-oxathianium iodide.
4. Hexahydro-1-(2-propynyl)-thiapyrylium bromide.
5. Hexahydro-1-(2-propynyl)-thiapyrylium chloride.
6. Tetrahydro-1-(2-propynyl)-thiophenium bromide.
7. A method for the manufacture of a compound corresponding to the formula

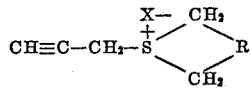

wherein X represents a member of the group consisting of chlorine, bromine and iodine, and R represents a radical selected from the group consisting of ethylene, trimethylene and oxydimethylene which comprises reacting a 2-propynyl halide with a compound selected from the group consisting of p-oxathiane, tetrahydrothiophene and tetrahydrothiapyran.

References Cited in the file of this patent

UNITED STATES PATENTS

| | | |
|---|---|---|
| 2,193,963 | Harris | Mar. 19, 1940 |
| 2,794,026 | Johnston | May 28, 1957 |

FOREIGN PATENTS

| | | |
|---|---|---|
| 649,135 | Fidler et al. | Jan. 17, 1951 |

OTHER REFERENCES

Meadow et al.: Journal of the American Chemical Society, vol. 56, p. 2179 (1934).

Masson: Journal of the Chemical Society, vol. 49, pp. 237, 249, 252 and 254 (1886).